DEVICE AND METHOD FOR PRODUCING A YARN PACKAGE

Filed Nov. 27, 1963 4 Sheets-Sheet 1

INVENTOR

WILLEM BAKKER

BY Francis W. Young

ATTORNEY

DEVICE AND METHOD FOR PRODUCING A YARN PACKAGE

Filed Nov. 27, 1963 4 Sheets-Sheet 2

INVENTOR
WILLEM BAKKER

BY Francis W. Young
ATTORNEY

DEVICE AND METHOD FOR PRODUCING A YARN PACKAGE

INVENTOR
WILLEM BAKKER

BY Francis W. Young
ATTORNEY

Nov. 8, 1966 W. BAKKER 3,283,489

DEVICE AND METHOD FOR PRODUCING A YARN PACKAGE

Filed Nov. 27, 1963 4 Sheets-Sheet 4

INVENTOR

WILLEM BAKKER

BY *Francis W. Young*

ATTORNEY

United States Patent Office 3,283,489
Patented Nov. 8, 1966

3,283,489

DEVICE AND METHOD FOR PRODUCING A YARN PACKAGE

Willem Bakker, Velp, Gelderland, Netherlands, assignor to American Enka Corporation, Enka, N.C., a corporation of Delaware Filed Nov. 27, 1963, Ser. No. 326,520
Claims priority, application Netherlands, Dec. 21, 1962, 287,162; Apr. 17, 1963, 291,641
26 Claims. (Cl. 57—34)

This invention relates to a device for producing a yarn package wound on a bobbin and more particularly to a device for producing a yarn package wound on a bobbin and provided with a transfer tail and an initial thread end which are fixed on the bobbin. The invention also relates to a method for effecting the winding of such packages.

It is conventional to provide yarn packages with transfer tails which sometimes also are referred to as rat tails. Such transfer or rat tails are yarn ends which project from the lower ends of the yarn packages and immediately procede the yarn windings of the package which are initially laid on and consequently are nearest to the surface of the bobbin. The presence of such a transfer tail is desired to provide a plurality of yarn packages which are capable of supplying upon unwinding a single continuous thread. During the transport and handling of the yarn package, in order to prevent both the transfer and the initial thread end, the latter being the end from which the unwinding of the package is started, from getting dirty, becoming frayed and/or becoming difficult to locate among the windings, the yarn ends often are fixed on the bobbin. This may be done by sticking them either to an outside or inside surface of the bobbin. It has also been suggested to fix the yarn ends by wedging same in notches which are provided in the edges of the bobbin. Both methods, however, have their drawbacks and have not provided completely suitable results.

More specifically, in both of such previously available techniques the fixing of the yarn ends undesirably must be done by a time-consuming hand operation during which the yarn ends and the package, moreover, may be, and often are, dirtied.

Satisfactory results, furthermore, are particularly difficult to realize using such methods if the yarn package is obtained on a drawtwister. This is an apparatus for drawing yarns manufactured from a linear polymer. In such a case the yarn ends must be so fixed that no undrawn pieces of yarn form part of the transfer tail or the initial thread end. Moreover, when it is necessary to change bobbins in the operation, it is desirable to try to keep the twisted yarn on the machines, which makes it particularly difficult to satisfactorily carry out doffing of the packages and to deal with the transfer tail and the initial thread end in a proper manner.

Another disadvantage of the above-mentioned known methods for fixing the initial thread end and the transfer tail results from the fact that in the processing of a yarn package it often is difficult to detach the two yarn ends. In any case, normal operations entail two separate operations, namely detaching the initial end and detaching the transfer tail. Such known methods for fixing the two thread ends thus are rather time-consuming, both for the manufacturer and for the user of the yarn package.

The present invention has for its primary object to provide a yarn package which is not characterized by the drawbacks characterizing previously available yarn packages.

It is an additional object of the present invention to provide a yarn package having clean, perfect and easily accessible yarn ends.

It is a further object of the present invention to provide a yarn package requiring a minimum of hard labor in the preparation thereof.

It is another object of the present invention to provide a yarn package in which the initial thread end and transfer tail end thereof are fixed entirely, simply, and efficiently by machine.

It is yet another object of the present invention to provide a yarn package from which a package having a free transfer tail and free initial thread end easily may be obtained by carrying out a single operation, i.e., pulling and/or cutting the threads connecting the yarn package to the waste bundle.

It is a further object of the present invention to provide a method for simply and efficiently preparing satisfactory yarn packages and a down twister for accomplishing the winding of such yarn packages.

It is a particular object of the present invention to provide a yarn package assembly wherein on one end, preferably the bottom end, of the bobbin, and at a relatively small distance from the yarn package itself a bundle of yarn windings is laid, to which and/or under which the ends of the initial thread end and the transfer tail are fixed, whereby the yarn ends simply and efficiently may be fixed onto the tube entirely by machine in an operation which immediately follows the winding of the body of the package, as a result of which the machine produces packages which are entirely ready for further use.

Other objects and advantages of the present invention will be apparent from the following detailed description.

The fixing of the initial thread end and the transfer tail with the aid of the bundle windings may be carried out according to the present invention in a simple manner. Usually this is achieved by positioning a fixation device, preferably formed of a synthetic material at the bottom end of the bobbin where the bundle is positioned. The fixation device has its back projecting from the circumference of the bobbin with a small bundle of fixation windings being laid on and/or against said back thereof.

In this last-mentioned case the back (i.e., that portion facing away from the bobbin surface) of the fixation device projects from the circumference of the bobbin and preferably is provided with an approximately T-shaped raised region therein, the vertical leg of the T extending in a direction substantially parallel to the bobbin axis, preferably with its free end pointing upwards and the two horizontal legs of the T extending substantially traverse to the axis of the bobbin to provide free spaces between the undersides thereof and the facing surfaces of the fixation device or bobbin which serve as slots, the surface of said horizontal side legs of the T in the region adjacent said vertical leg of the T-shaped member also being substantially more raised than the surface of said vertical leg to define thread clamping surfaces on the upper sides thereof which extend approximately transverse to the longitudinal axis of the bobbin. The height of the vertical leg of the T may, and preferably does, slope toward the region wherein it is adjacent said horizontal side legs.

In the operation of the present method the fixation device is fixed to said bobbin with the surface bearing said T-shaped projection facing outwardly and a package is wound on a bobbin by a procedure which includes initially forming a waste bundle on the winding spindle and subsequently forming a package on the bobbin by conventionally controlling the traverse motion of a rail ring along the bobbin length. The present method includes the additional step wherein subsequent to the formation of the waste bundle and preliminary to the winding of the package on the bobbin, a bundle of fixation windings is laid on the vertical middle leg of the T in front of and against the clamping surfaces of the horizontal legs thereof, along which, after completion of the package, the last windings of the fixation bundle are clamped by the previously laid windings of the bundle. When the yarn package is raised in order to be removed from the machine, the last winding is clamped between the fixation bundle and the clamping surface of the fixation device, because the two threads connecting the waste bundle on the twisting spindle of the draw-twister with the initial thread end and with the transfer tail are pulled into the afore-mentioned slots between the horizontal legs of the fixation device and the facing surface.

Using such an apparatus and method of the invention to prepare a yarn package, the yarn ends thereof simply may be fixed onto the bobbin tube entirely by machine in an operation which immediately follows the windings of the body of the package, as a result of which the machine, in particular a drawtwister, produces packages which are immediately ready for further use. In this manner clean and perfect yarn ends are obtained and the work of the operating personnel is reduced to a minimum. In order to obtain a free transfer tail and free initial thread end the user of the package need only carry out a single operation, namely cutting the bundle of fixation windings, or pulling the fixation member out of its thread clamping position, in which case the yarn bundle as well as the initial thread end and the transfer tail simply are grasped and caught between the user's thumb and forefinger.

A highly satisfactory clamping of a number of windings of the fixation bundle on the clamping surface is obtained if the clamping surface is a surface in a plane perpendicular to the bobbin axis and graduates into a bevelled surface forming the sides of the horizontal legs, adjacent thereto.

In the more preferred embodiments of the invention the fixation member has on either or both sides of the vertical leg of the T-shaped back a supplemental thread guiding member defining a surface projecting from the circumference of the bobbin, which guiding surface so slopes down from beside the vertical leg and at some distance therefrom to the horizontal legs of the approximately T-shaped back, and so crosses the clamping surface that the yarn windings laid on the guiding surface are forced in the direction of the horizontal legs of the T-shaped back.

The width of the clamping surface in the radical direction need be only about 1 mm. at the most.

The afore-mentioned cutting of the bundle of windings by the user is facilitated if the T-shaped back of the fixation device is divided into two sections by a recess therein which extends axially the height of the middle vertical leg and between the side horizontal legs.

If the bobbin used consists of an inner tube and an outer tube concentric therewith, as is often the case, the fixation device preferably is provided with an arc-shaped plate, a lower portion of which is attached to the side legs of the T-shaped back of the fixation device and a wedge-shaped upper part of which is free to be adapted to be pushed between the inner and the outer tubes of the bobbin assembly.

In accordance with preferred embodiments of the invention a down twister is provided which has a twisting spindle upon which a bobbin is mounted and a circular rim is positioned on the spindle below the bobbin with the outer rim thereof projecting from the circumference of the bobbin. The circular rim advantageously may be provided with two notches therein which in oppositely directed helices run oblique to the axis of the twisting spindle and are positioned relative to each other at an angular displacement, preferably of about 180°.

In one notch is laid the thread connecting the initially laid waste bundle with the initial thread end and in the other notch is laid the thread connecting the waste bundle with the transfer tail. During the winding operation said connecting threads are automatically caught by the respective notches. When the package formed in accordance with the invention is being removed from the winding machine the two afore-mentioned connecting threads are tightened and are broken between the slots formed by the above-described fixation member and the circular rim.

Advantageous results are obtained if in the down twister of the afore-mentioned type the circular rim is provided with bevelled side faces. In the operation of such a down twister, when the ring rail passes upwardly past the circular rim to the level of the bobbin, a number of windings slips upwards along the bevelled side faces and are pulled onto the clamping surface, and when the ring rail passes downwardly past said rim to the level of the waste bobbin, again a number of windings slips upwards along the bevelled side faces and are pulled onto the clamping surface with the previously laid bundle of fixation windings.

Excellent results are also obtained wherein the circular rim has an outer circumference which is significantly rounded. The use of down-twisters having such rounded circular rims is particularly advantageous in instances wherein the fixation device is provided with supplemental guiding members positioned adjacent the vertical leg of the T as described above. By the use of such a combination there is more certainty that without the ring rail needing to be stopped and maintained stationary for a period, a sufficient number of windings is laid to form the fixation bundle. As a result of the sloping position of the supplemental guiding member(s) surface, the windings laid thereon slip to finally rest against the clamping surface, so that a concentrated fixation bundle easily and quickly is formed. Moreover, in such embodiments the transfer tail and the initial thread end are fixed more firmly. The supplemental guiding surfaces ensure that the fixation bundle is laid with the thread sharply bent between the clamping surfaces and the bobbin surface, as a result of which the fixation bundle presses with significant force against and is tightened on the clamping surface.

Guiding members are particularly adapted to be employed in a drawtwister comprising a large number of twisting spindles wth bobbins placed thereon, the traverse motion for winding being effected by a common ring rail for all the spindles. Previously, due to the differences in the level of the spindles relative to the common ring rail, owing for instance to wear of the axial spindle bearings, the level of the fixation members provided on the bobbins relative to the ring rail undesirably varied. The use of fixation devices of the invention provided with such supplemental guiding members ensures that invariably the same number of windings is laid to form a fixation bundle irrespective of the aforementioned variations in level.

The bundle advantageously is caused to exert a higher pressure on the clamping surface if each of the supplemental guiding members positioned on either side of and at some distance from the vertical leg have inwardly sloping surfaces which partially extend beyond the clamping surface, and the guiding members are partially positioned between the clamping surface and the bobbin surface.

The invention contemplates a method for the winding of one or more of the above-mentioned yarn packages, wherein the rail ring initially is raised from an initial position in which the twisting ring is opposite a waste bobbin on the twisting spindle below the yarn bobbin, whereby the thread is caught in one notch in the circular rim of the twisting spindle, a bundle of fixation windings is then laid on the bottom end of the bobbin below the lower limit of the normal traverse stroke of the rail ring, the rail ring is subsequently raised as far as the lower limit of its normal traverse stroke, while at the same time a few windings forming a transfer tail are laid on the bobbin, the rail ring thereafter is caused to traverse the bobbin to lay on superimposed windings and form a yarn package, the ring rail is then moved to a point below the lower limit of its normal traverse stroke to lay one or more windings between said yarn package and said fixation bundle at the bottom end of the bobbin forming an initial thread end and one or more additional windings on said fixation bundle at the bottom end of the bobbin until the ring rail is again in its initial position, whereby the thread is caught in the second notch in said circular rim when said thread passes the circular rim of the twisting spindle, the winding machine is stopped, and thereafter the yarn package is removed from the twisting spindle to pull the thread connecting the waste bobbin with the transfer tail and the thread connecting the waste bobbin with the initial thread end into the slots of the fixation device, whereby said two connecting threads are broken and the initial thread end is clamped between the bundle laid on the fixation device and the clamping surface of the fixation device.

The invention also contemplates a bobbin for the winding of a yarn package according to the invention which is provided at one end thereof with a fixation device for receiving a bundle of windings to which and/or under which the ends of the initial length and the transfer tail of the yarn can be fixed.

The invention will be further described with reference to the accompanying drawings of which:

Figure 1:
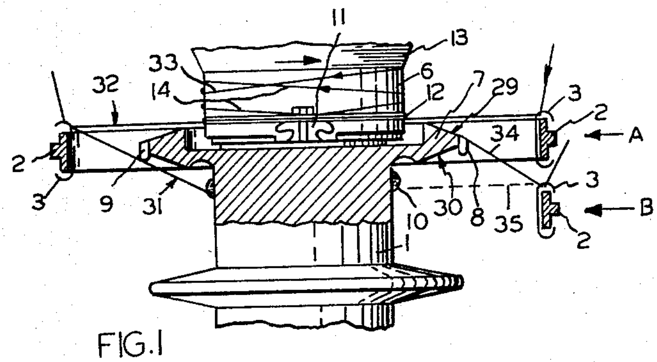
FIGURE 1 is a front plan view partially in section of an embodiment of a drawn twister of the invention with part of a yarn package wound thereon.

FIGURE 1 shows a detail of a twisting spindle 1 of a draw-twisting machine with a corresponding twisting ring 2 and a traveller 3 movable thereon. Mounted on three flat engaging surfaces 4 of the twisting spindle 1 is a bobbin which consists of an inner tube 5 and an outer tube 6. At the level of the lower edge of tube 6 the twisting spindle 1 has a circular rim 7 which is provided with two diametrically opposed notches 8 and 9 which are directed oppositely oblique relative to the direction of rotation of the spindle. Below the circular rim 7 a bundle of waste yarn 10 is laid on spindle 1. At its lower edge the bobbin is provided with a fixation device 11 on which a yarn bundle 12 is laid. On the bobbin is also laid a yarn package 13 and between the lower end of the package 13 and the bundle 12 there are a few windings 14 that form the transfer tail.

The fixation device 11 is represented on a larger scale in FIGURES 5 to 10 inclusive which show that the device 11 has a raised back portion which projects from the circumference of the bobbin and is substantially T-shaped. In the middle of the T a recess 15 is provided which divides the vertical middle leg of the T into two halves 16 and 17 and separates two horizontal side legs 18 and 19 of the T.

The fixation member 11 also is provided with an arc-shaped plate 20 with a tapering upper part 20′, which plate at its lower part is attached to the two horizontal side legs 18 and 19 and is attached to the bobbin assembly by pushing and wedging it between inner tube 5 and outer tube 6. The horizontal side legs 18 and 19 are provided with bevelled side faces 21—21′ and 22—22′, respectively. On the side adjacent the vertical leg of the T, the side legs 18 and 19 are provided with clamping surfaces 23 and 24, respectively, which extend approximately transverse to the longitudinal axis of the bobbin. The undersides of the side legs 18 and 19 at the free ends thereof are at some distance from the plate 20, so that slots 25 and 26 are formed between the undersides of the horizontal legs and the surface of the bobbin. In the bevelled side faces 21 and 22 are positioned recesses 27 and 28, respectively. The circular rim 7 of the twisting spindle 1, is provided with bevelled side faces 29 and 30. Rim 7 overlaps bevelled faces 21 and 22 of the fixation device 11, as appears from FIGURE 10.

When the twisting machine is started up and the yarn is twisted in, twisting ring 2 is in position B and winds the yarn on to a part of the twisting spindle which serves as waste bobbin, forming a waste bundle 10. As soon as the process runs satisfactorily, twisting ring 2 is raised to position A, in which position the thread 31 is caught by notch 9 in rim 7, slips over said rim 7 and is wound, while in position 32, on to yarn bobbin 6 to form fixation bundle 12. Spindle 1 rotates in the direction indicated by the arrow to produce a yarn having an S-twist. Bundle 12 is at the same time laid on back parts 16 and 17 of T-shaped fixation device 11 and is caused to be squeezed against clamping surfaces 23 and 24 in that the thread slips over bevelled side faces 21 and 22 which form a continuation of the clamping surfaces 23 and 24, respectively. Yarn bundle 12 bridges recess 15 between back parts 16 and 17.

After twisting ring 2 has been stationary for a short period in position A in order to wind fixation bundle 12, it is raised, at the same time laying a few windings 14 which form a transfer tail. When twisting ring 2 has reached the lower limit of the normal traverse stroke the formation of the actual yarn package 13 begins. When yarn package 13 is finished, twisting ring 2 is again moved downwards to position B. During said downward movement, a few steep windings 33 are laid on the bobbin, which windings 33 are to provide the initial yarn end of the package and a few additional windings are added to fixation bundle 12 since a number of windings slip from bevelled face 29 of rim 7 to bundle 12. Just before twisting ring 2 arrives at position B thread 34 is caught by notch 8 and subsequently springs into position 35 and whereupon it is wound on waste bobbin 10. The machine then is stopped to remove the yarn package.

Figure 3:
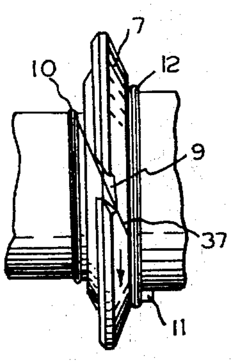
FIGURES 3 and 4 are diametrically oppoesed partial side views of FIGURE 1.
Figure 2:
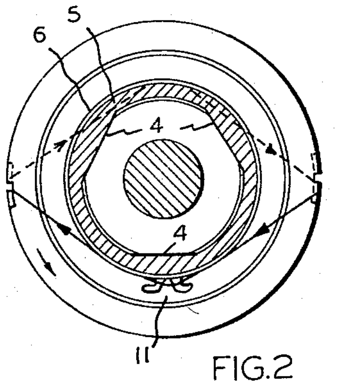
FIGURE 2 is a top plan view partially in section of the down twister of FIGURE 1.
Figure 4:
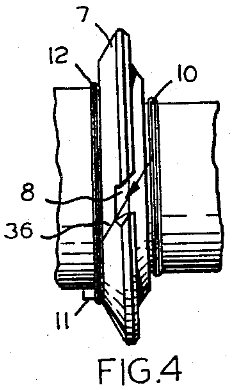
Figure 5:
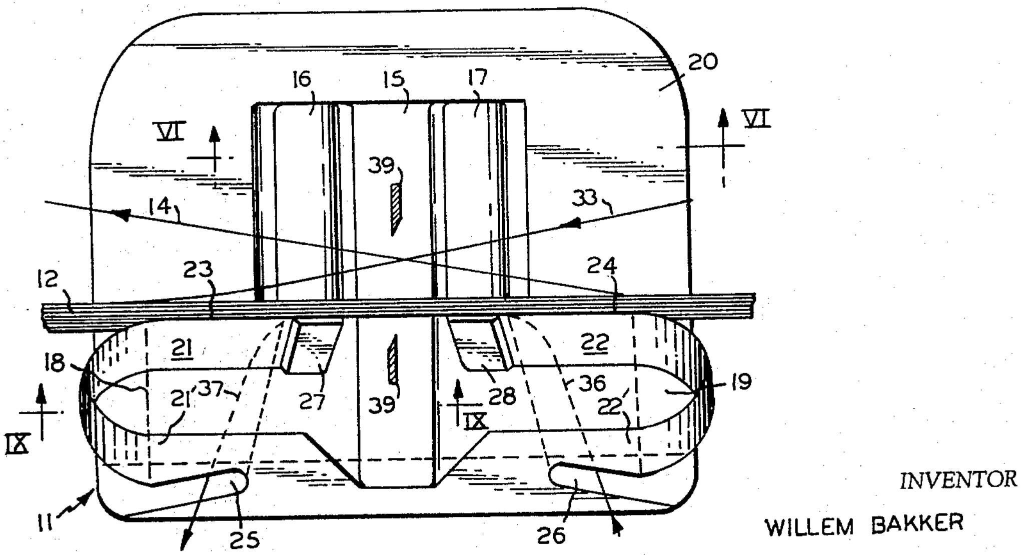
FIGURE 5 is a front plan view of an embodiment of a fixation member of the invention (shown in FIGURE 1).
Figures 6, 7:
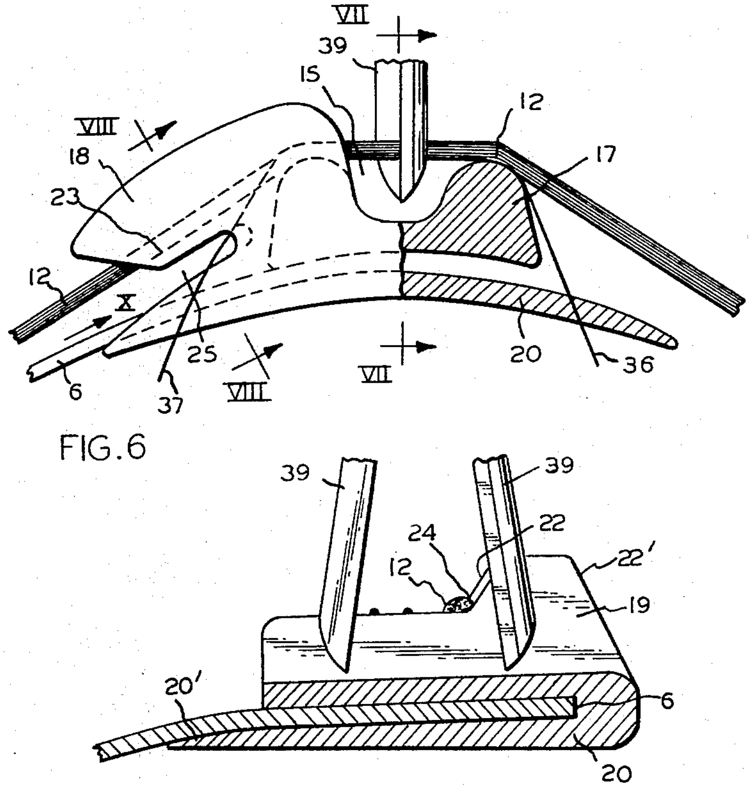
FIGURE 6 is a bottom plan view of the fixation device of FIGURE 5 partially in a section along the line VI—VI.
FIGURE 7 is a sectional view taken from FIGURE 6 along the line VII—VII.
Figure 8:
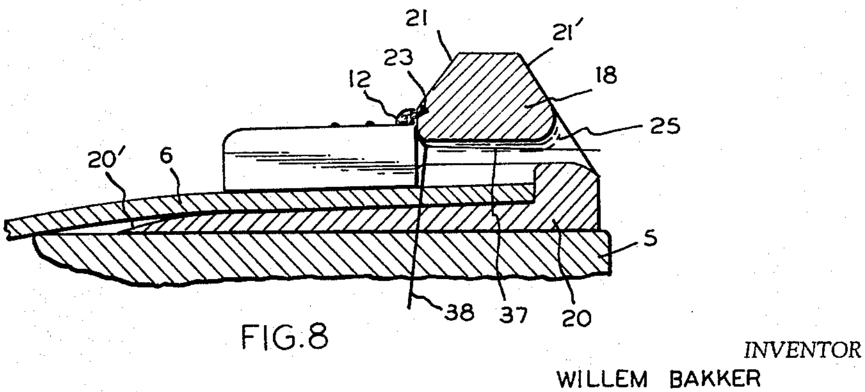
FIGURE 8 is a sectional view taken from FIGURE 6 along the line VIII—VIII and includes tubes of a bobbin assembly to which the fixation device is attached.
Figures 9, 10:
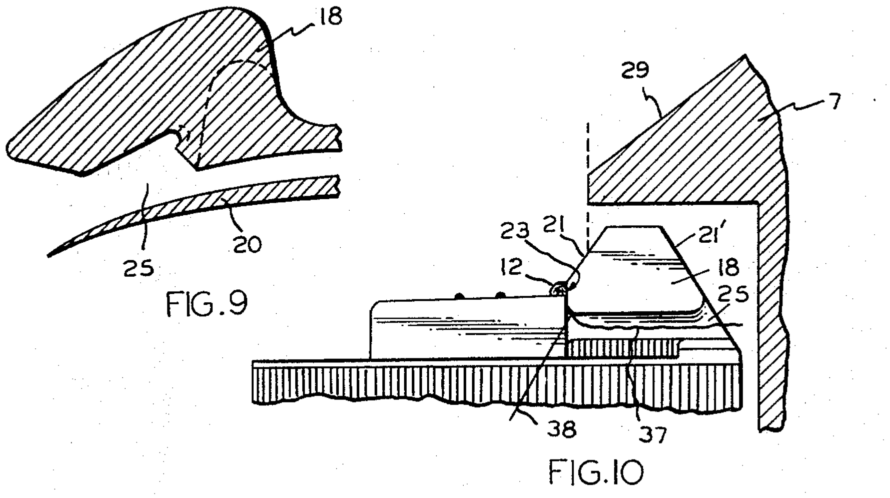
FIGURE 9 is a sectional view taken from FIGURE 5 along the line IX—IX.
FIGURE 10 is a sectional view taken from FIGURE 6 in the direction indicated by the arrow X and includes a portion of a twisting spindle adjacent to which the fixation device is positioned.

FIGURES 2, 3, and 4, show the situation after the machine has been stopped, twisting ring 2 being in position B. The thread connecting waste bundle 10 with transfer tail 14 of the package is in position 36 and the thread connecting waste bundle 10 with initial thread end 33 of the package is in position 37.

Figure 11:
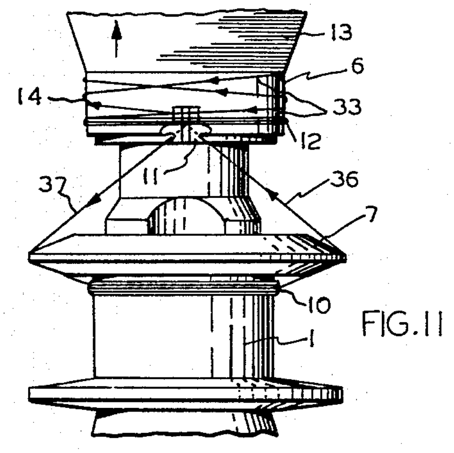
FIGURE 11 is a front plan view of the down twister of FIGURE 1 during the removal of a yarn package previously wound thereon.
Figure 12:
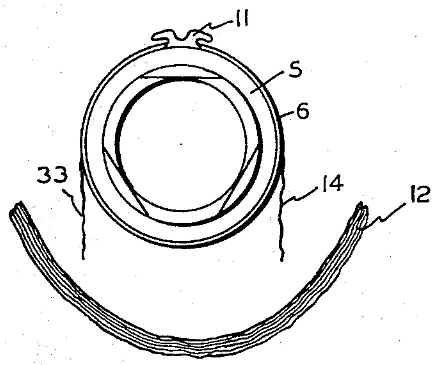
FIGURE 12 is a partial bottom plan view of the bobbin shown in FIGURE 1 with the yarn package after the bundle of windings has been cut.
Figure 13:
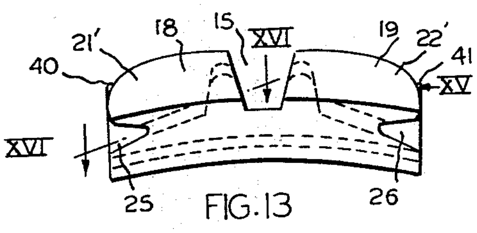
FIGURE 13 is a bottom plan view of another embodiment of a fixation member of the invention.
Figure 14:
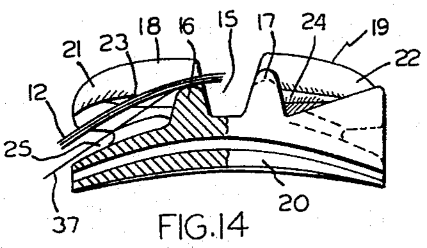
FIGURE 14 is a top plan view partially in section taken along line XIV—XIV of FIGURE 16 of the fixation device of FIGURE 13 including a winding of thread laid thereon.
Figure 15:
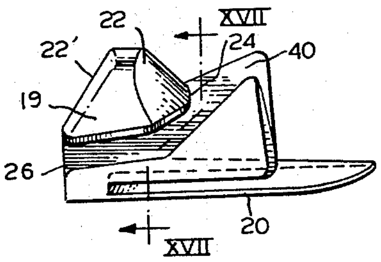
FIGURE 15 is a partial side plan view of FIGURE 13 taken in the direction of arrow XV.
Figure 16:
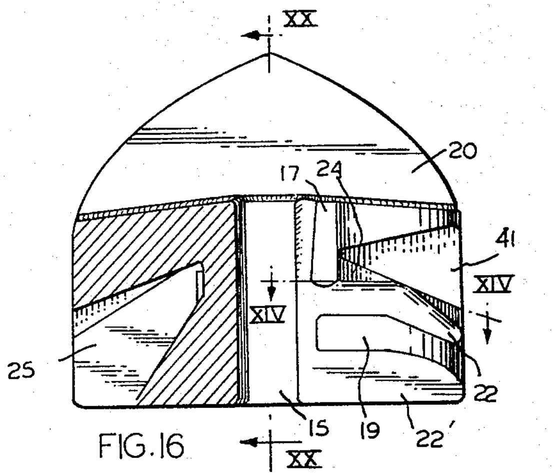
FIGURE 16 is a plan view of FIGURE 13 taken in the direction of arrow XVI and partially in section along line XVI—XVI.
Figure 17:
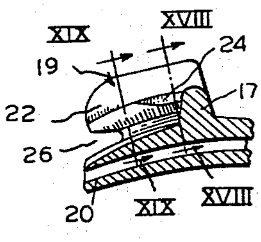
FIGURE 17 is a partial sectional view of FIGURE 15 taken along line XVII—XVII.
Figure 21:
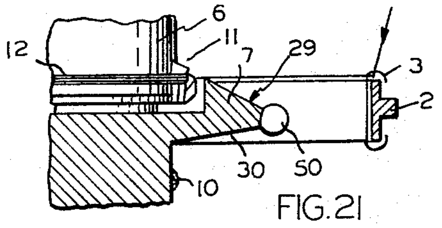
FIGURE 21 is a partial side view partially in section of a draw twister of the invention showing the fixation device shown in FIGURES 13 to 20 and the position of the rim of the twisting spindle with respect to the fixation device.
Figure 18:
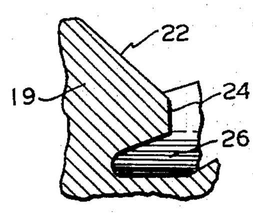
FIGURE 18 is a partial sectional view of FIGURE 17 taken along line XVIII—XVIII.
Figure 19:
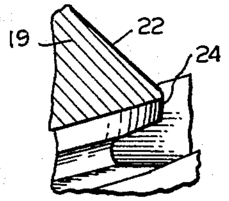
FIGURE 19 is a partial sectional view of FIGURE 17 taken along line XIX—XIX.
Figure 20:
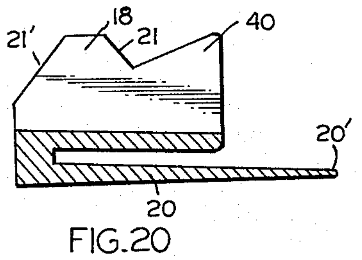
FIGURE 20 is a partial sectional view of FIGURE 16 taken along line XX.

When the bobbin with the package wound thereon is moved upwards in the direction indicated by the arrow (FIGURE 11) for the removal of the package from the machine, the connecting threads 36 and 37 are tightened. The thread in position 36 was the first to be laid and is under bundle 12. The thread in position 37 was the last to be laid on bundle 12 and consequently lies on the surface thereof. In further raising the bobbin with the package the two connecting threads 36 and 37 are pullled into slots 26 and 25, respectively, and break if the bobbin upward movement is continued. Thread 36 is already fixed and in the broken state is under bundle 12. Before breaking, thread 37 squeezes itself between clamping surfaces 23, 24 and bundle 12. When thread 37 breaks in slot 25 at the point indicated by the arrow 38 (FIGURE 8), the end thereof remains clamped between bundle 12 and clamping surfaces 23, 24.

The ends of the initial thread end 33 and transfer tail 14 thus are secured respectively to and under bundle 12. In order to obtain a free transfer tail 14 and a free initial thread end 33 the user of the yarn package need only cut bundle 12 (FIGURES 5, 6, 7, 12) with a scissors 39 in recess 15 of the T-shaped back of the fixation device.

Another embodiment of the fixation device of the invention is shown in FIGURES 13 to 21 inclusive. Same numbers are used in FIGURES 13 to 21 to represent like elements shown in FIGURES 1 to 12. As in the device shown in FIGURES 1 to 12, the fixation device 11 of FIGURES 13 to 21 has a back piece which projects from the circumference of the bobbin and is substantially T-shaped. In the middle of the T there axially extends a recess 15, which divides the vertical leg of the T into two halves 16 and 17 and separates the two horizontal legs 18 and 19. The upper surfaces of the two halves 16 and 17 of the vertical leg slope down from the free end of the vertical leg toward the region adjacent horizontal legs 18 and 19. A supplemental thread guiding surface is formed by the surfaces 40 and 41 of a second back piece of fixation device 11, which surfaces are positioned to the sides of the vertical leg of the T-shaped back piece. Surfaces 40 and 41, slope down toward the region adjacent horizontal legs 18 and 19. Fixation device 11 is provided with plate 20 which tapers at one free side 20', which plate 20 at its other side is attached to the two horizontal legs 18 and 19 and is adapted to be attached to the bobbin assembly by pushing and wedging it between inner tube 5 and outer tube 6. The horizontal legs 18 and 19 are provided with bevelled side faces 21–21' and 22–22', respectively. On the side adjacent the vertical leg of the T, horizontal legs 18 and 19 are provided with clamping surfaces 23 and 24, respectively, which extend approximately transverse to the longitudinal axis of the bobbin. The undersides of the horizontal legs 18 and 19 at the free ends thereof are at same distance from the base surface of the fixation device, so that slots 25 and 26 are formed between the undersides of the horizontal legs and the base surface. Circular rim 7 of twisting spindle 1 is provided with bevelled side faces 29 and 30. Rim 7 has a strongly rounded outer circumference 50 and the edge of rim 7 overlaps bevelled side faces 21 and 22 of the fixation member, as appears from FIGURE 21.

A fixation bundle 12 comprises windings which have been laid on the guiding surface formed by the surfaces 40 and 41 and have slipped downwards along the sloping guiding surfaces to lay against the clamping surfaces 23 and 24. In this way a number of windings squeeze themselves, as it were, against the clamping surfaces 23 and 24 in that the thread also slips over the bevelled side faces 21 and 22 which form a continuation of the clamping surfaces 23 and 24, respectively. By means of this embodiment of the invention a yarn package may be formed in the same manner as with the fixation device shown in FIGURES 1 to 12, but also with this embodiment (FIGURES 13 to 21), the fixation bundle 12 may be laid without the ring rail being stationary at the level of the fixation member.

It is to be understood that the foregoing detailed description is given merely by way of illustration and that many variations may be made therein without departing from the spirit of this invention.

What is claimed is:

1. A fixation device, for use in combination with a bobbin upon which a yarn package is to be wound, having on one face thereof a raised region approximately defining a T and being adapted to be fixedly attached to a bobbin mounted on a yarn twisting spindle so that said face thereof provided with said raised T-shaped region faces away from the surface of said bobbin with the vertical leg of said T substantially parallel to the axis of said bobbin and the two horizontal legs of said T extend substantially transverse to the axis of said bobbin, the ends of said horizontal legs of said T extending beyond the surface of said device to provide free spaces in the form of slots between the undersides of said horizontal legs and the yarn-contacting surface of said bobbin and the surfaces of said two horizontal legs of said T in the regions adjacent said vertical leg of said T being substantially more raised than the surface of said vertical leg to define thread clamping surfaces on the upper sides thereof which extend approximately transverse to the axis of said bobbin.

2. The fixation device according to claim 1 wherein the height of said raised region defining said vertical leg of said T increases along the length of said vertical leg as it runs in a direction away from the region adjacent said two horizontal legs of said T.

3. The fixation device according to claim 1 wherein said face thereof having said raised approximately T-shaped region therein also is provided with a raised region on each side of said vertical leg of said T which defines a yarn guiding surface, each of said yarn guiding surfaces sloping toward the horizontal leg of said T adjacent thereto and lying in a plane which intersects the plane defined by said thread clamping surface of said adjacent horizontal leg of said T.

4. The fixation device according to claim 1 wherein said thread clamping surfaces on the upper sides of said horizontal legs of said T graduate into bevelled surfaces formed on the adjacent faces of said horizontal side legs removed from said bobbin.

5. The fixation device according to claim 4 wherein the width of said clamping surfaces in a radial direction from the axis of said bobbin is at most about 1 mm.

6. The fixation device according to claim 1 wherein a recess is provided in said vertical middle leg of said T which extends the length of said vertical leg and between said horizontal side legs of said T to divide said approximately T-shaped raised region into two parts.

7. A down twister for producing a yarn package comprising a twisting spindle provided with a circular rim projecting from the circumference of said spindle, said circular rim being provided with two notches in the periphery thereof, which notches are spaced apart and run in directions of oppositely directed helices oblique to the axis of said spindle, a bobbin mounted on said twisting spindle adjacent and above said circular rim, and a fixation device positioned adjacent the bottom of said bobbin and having a face thereof spaced from the surface of said bobbin, said fixation device having a raised region approximately defining a T with the vertical leg of said T being substantially parallel to the axis of said bobbin and the two horizontal legs of said T extending substantially transverse to the axis of said bobbin, the ends of said horizontal legs of said T extending beyond the surface of said device to provide free spaces in the form of slots between the undersides of said horizontal legs and the yarn-contacting surface of said bobbin and the surfaces of said two horizontal legs of said T in the regions adjacent said vertical leg of said T being substantially more raised than the surface of said vertical leg to define thread clamping surfaces on the upper sides thereof which extend approximately transverse to the axis of said bobbin.

8. The down twister according to claim 7 wherein the height of said raised region defining said vertical leg of said T increases along the length of said vertical leg as it runs in a direction away from the region adjacent said two horizontal legs of said T.

9. The down twister according to claim 7 wherein said face of said fixation device having said raised approximately T-shaped region therein also is provided with a raised region on each side of said vertical leg of said T which defines a yarn guiding surface, each of said yarn guiding surfaces sloping toward the horizontal leg of said T adjacent thereto and lying in a plane which intersects the plane defined by said thread clamping surface of said adjacent horizontal leg of said T.

10. The down twister according to claim 7 wherein said thread clamping surfaces on the upper sides of said horizontal legs of said T graduate into bevelled surfaces formed on the adjacent faces of said horizontal side legs removed from said bobbin.

11. The down twister according to claim 10 wherein the width of said clamping surfaces in a radial direction from the axis of said bobbin is at most about 1 mm.

12. The down twister according to claim 7 wherein a recess is provided in said vertical middle leg of said T which extends the length of said vertical leg and between said horizontal side legs of said T to divide said approximately T-shaped raised region into two parts.

13. The down twister according to claim 7 wherein the edges of said circular rim are bevelled.

14. The down twister according to claim 7 wherein the edge of said circular rim is rounded.

15. The down twister according to claim 7 wherein said bobbin is in the form of superimposed tube members and said fixation device is attached to said bobbin by means of a plate attached to said fixation device which is adapted to be inserted and wedged in the space between said tube members at the ends of said tube members.

16. The down twister according to claim 7 wherein said notches in said circular rim are spaced apart at an angular displacement of about 180°.

17. In a method for producing a yarn package on a rotating bobbin mounted on a twisting spindle wherein yarn initially is guided by a rail ring to form a waste bundle on said twisting spindle below said bobbin and a yarn package subsequently is formed on said bobbin by a traverse motion of said rail ring along the bobbin length, the improvement which comprises subsequent to said formation of said waste bundle and preliminary to said formation of said yarn package guiding said yarn to lay a bundle of fixation windings between said waste bundle and said yarn package so that each freshly laid winding of said fixation bundle is held and clamped in place in said fixation bundle and, subsequent to the formation of said yarn package guiding additional windings on said fixation bundle so that each freshly laid winding is held and clamped in place in said resultant fixation bundle and the last winding laid on said fixation bundle is adapted to be pulled and wedged under said fixation bundle upon said bobbin carrying said yarn package being raised.

18. The process according to claim 17 wherein following the laying of said last winding on said fixation bundle, raising said bobbin bearing said yarn package whereby said last laid winding on said fixation bundle is pulled and fixed under said fixation bundle, and thereafter severing the threads connecting said waste bundle to said fixation bundle.

19. A yarn package assembly comprising a yarn package wound on a bobbin and provided with a transfer tail and an initial thread end which are fixed on the bobbin, characterized in that on one end of the bobbin and at a distance from said yarn package a separate small bundle of windings is laid under which the ends of the initial thread end and the transfer tail are fixed.

20. The yarn package assembly according to claim 19 characterized in that the bobbin at its end where said separate small bundle is positioned is provided with a fixation device which device has a raised surface projecting from the circumference of the bobbin, said separate small bundle of windings being laid against said raised surface of said device.

21. The yarn package assembly according to claim 20 wherein said raised surface of said fixation device approximately defines a T with the vertical leg of said T extending substantially parallel to the axis of said bobbin and the two horizontal legs of said T extending substantially transverse to the axis of said bobbin, the ends of said horizontal legs of said T extending beyond the surface of said device to provide free spaces in the form of slots between the underside of said horizontal legs and the yarn-contacting surface of said bobbin and the surfaces of said two horizontal legs of said T in the regions adjacent said vertical leg of said T being substantially more raised than the surface of said vertical leg to define thread clamping surfaces on the upper sides thereof, which clamping surfaces extend approximately transverse to the axis of said bobbin and against which said separate small bundle of windings is tightly laid with said ends of said transfer tail and said initial thread end extending through said slots.

22. The yarn package assembly according to claim 21 wherein the height of said raised region defining said vertical leg of said T increases along the length of said vertical leg as it runs in a direction away from the region adjacent said two horizontal legs of said T.

23. The yarn package assembly according to claim 21 wherein said face thereof having said raised approximately T-shaped region therein also is provided with a raised region on each side of said vertical leg of said T which defines a yarn guiding surface, each of said yarn guiding surfaces sloping toward the horizontal leg of said T adjacent thereto and lying in a plane which intersects the plane defined by said thread clamping surface of said adjacent horizontal leg of said T.

24. The yarn package assembly according to claim 21 wherein said thread clamping surfaces on the upper sides of said horizontal legs of said T graduate into bevelled surfaces formed on the adjacent faces of said horizontal side legs removed from said bobbin.

25. The yarn package assembly according to claim 24 wherein the width of said clamping surface in a radial direction from the axis of said bobbin is at most about 1 mm.

26. The yarn package assembly according to claim 21 wherein a recess is provided in said vertical middle leg of said T which extends the length of said vertical leg and between said horizontal side legs of said T to divide said approximately T-shaped raised region into two parts.

References Cited by the Examiner

UNITED STATES PATENTS

| | | | |
|---|---|---|---|
| 2,428,081 | 9/1947 | Keight et al. | 57—34 |
| 2,949,722 | 8/1960 | Henry et al. | 57—34 |
| 3,075,715 | 1/1963 | Hensen et al. | 242—18 |

FOREIGN PATENTS

| | | |
|---|---|---|
| 1,369,717 | 9/1963 | France. |

OTHER REFERENCES

Brunner: German application No. 1,079,512, published 4/1960.

STANLEY N. GILREATH, *Primary Examiner.*